(12) United States Patent
Kumar et al.

(10) Patent No.: US 9,391,913 B2
(45) Date of Patent: *Jul. 12, 2016

(54) EXPRESS VIRTUAL CHANNELS IN AN ON-CHIP INTERCONNECTION NETWORK

(75) Inventors: Amit Kumar, Princeton, NJ (US); Partha P Kundu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/551,537

(22) Filed: Jul. 17, 2012

(65) Prior Publication Data

US 2013/0070763 A1    Mar. 21, 2013

(51) Int. Cl.
| | |
|---|---|
| H04L 12/28 | (2006.01) |
| H04L 12/801 | (2013.01) |
| H04L 12/701 | (2013.01) |
| H04L 12/721 | (2013.01) |
| H04L 12/851 | (2013.01) |
| H04L 12/933 | (2013.01) |

(52) U.S. Cl.
CPC ............... *H04L 47/33* (2013.01); *H04L 45/00* (2013.01); *H04L 45/40* (2013.01); *H04L 47/10* (2013.01); *H04L 47/2433* (2013.01); *H04L 49/101* (2013.01)

(58) Field of Classification Search
None
See application file for complete search history.

(56) References Cited

U.S. PATENT DOCUMENTS

| | | | |
|---|---|---|---|
| 5,633,876 A | 5/1997 | Dinkins | |
| 6,009,488 A | 12/1999 | Kavipurapu | |
| 6,055,618 A | 4/2000 | Thorson | |
| 6,674,720 B1 | 1/2004 | Passint et al. | |
| 6,751,190 B1 | 6/2004 | Swallow | |
| 6,822,962 B1 | 11/2004 | Noake et al. | |
| 7,406,031 B1 | 7/2008 | Swallow | |
| 7,433,316 B2 | 10/2008 | Xu et al. | |
| 2002/0146022 A1 | 10/2002 | Van Doren et al. | |
| 2002/0150056 A1 | 10/2002 | Abadi et al. | |
| 2002/0167900 A1 | 11/2002 | Mark et al. | |
| 2003/0074493 A1 | 4/2003 | Askar et al. | |
| 2003/0097514 A1 | 5/2003 | Ennis et al. | |
| 2004/0078482 A1 | 4/2004 | Blumrich et al. | |
| 2004/0165536 A1 | 8/2004 | Xu et al. | |

(Continued)

FOREIGN PATENT DOCUMENTS

| | | |
|---|---|---|
| CN | 1705297 A | 12/2005 |
| JP | 1-225260 A | 9/1989 |

(Continued)

OTHER PUBLICATIONS

International Search report and Written Opinion Received for PCT Patent Application No. PCT/US2009/038874, mailed on Nov. 16, 2009, 12 pages.

(Continued)

*Primary Examiner* — Afshawn Towfighi
(74) *Attorney, Agent, or Firm* — Alpine Technology Law Group LLC

(57) ABSTRACT

A method, router node, and set of instructions for using express virtual channels in a component network on a chip are disclosed. An input link 302 may receive an express flow control unit from a source node 102 in a packet-switched network via an express virtual channel 110. An output link 306 may send the express flow control unit to a sink node 106. A switch allocator 322 may forward the express flow control unit directly to the output link 306.

21 Claims, 14 Drawing Sheets

(56) References Cited

U.S. PATENT DOCUMENTS

| | | |
|---|---|---|
| 2005/0100025 A1 | 5/2005 | Nagami et al. |
| 2005/0251500 A1 | 11/2005 | Vahalia et al. |
| 2006/0080461 A1 | 4/2006 | Wilcox et al. |
| 2007/0140240 A1 | 6/2007 | Dally et al. |
| 2008/0091842 A1 | 4/2008 | Blumrich et al. |
| 2008/0109586 A1 | 5/2008 | Godiwala et al. |
| 2009/0064140 A1 | 3/2009 | Arimilli et al. |

FOREIGN PATENT DOCUMENTS

| | | |
|---|---|---|
| JP | 8-256154 A | 10/1996 |
| JP | 2002-057710 A | 2/2002 |
| JP | 2002-169787 A | 6/2002 |
| JP | 2003-258864 A | 9/2003 |
| JP | 2004-248085 A | 9/2004 |
| WO | 02/084508 A1 | 10/2002 |
| WO | 2009/146025 A2 | 12/2009 |
| WO | 2009/146025 A3 | 3/2010 |

OTHER PUBLICATIONS

Dally, William J., "Express Cubes: Improving the Performance of k-ary n-cube Interconnection Networks", IEEE Transactions of Computers, vol. 40, No. 9, Sep. 1991, 8 pages.

International Preliminary Report on Patentability Received for PCT Patent Application No. PCT/US2009/038874 mailed on Oct. 14, 2010, 7 pages.

Office Action Received for Korean Patent Application No. 2010-7022092, mailed on Sep. 16, 2011, 3 pages of English translation only.

Office Action Received for Russian Patent Application No. 2010139595, mailed on Oct. 19, 2011, 4 pages of Office Action and 2 pages of English translation.

Notice of Allowance Received for Korean Patent Application No. 2010-7022092, mailed on Apr. 25, 2012, 2 pages of Notice of Allowance and 1 page of English Translation.

Office Action Received for Russian Patent Application No. 2010139595, mailed on Apr. 2, 2012, 6 pages of Office Action and 4 pages of English Translation.

Office Action Received for U.S. Appl. No. 12/061,302, mailed on Mar. 23, 2010, 9 pages.

Office Action Received for U.S. Appl. No. 12/061,302, mailed on Oct. 28, 2010, 13 pages.

Office Action Received for U.S. Appl. No. 12/061,302, mailed on Jun. 22, 2011, 11 pages.

Notice of Allowance Received for U.S. Appl. No. 12/061,302, mailed on Mar. 14, 2012, 12 pages.

Office Action Received for Japanese Patent Application No. 2011-503088, mailed on Aug. 21, 2012, 2 pages of Office Action and 2 pages of English Translation.

Kumar et al., "Express Virtual Channels: Towards the Ideal Interconnection Fabric", in the Proceedings of 34th Annual International Symposium on Computer Architecture, ISCA '07, Jun. 9-13, 2007, vol. 35 Issue 2, pp. 150-161.

Office Action Received for Chinese Patent Application No. 200980110393.9, mailed on Oct. 10, 2012, 6 pages of Office Action and 9 pages of English Translation, 15 pages.

Office Action Received for Japanese Patent Application No. 2011-503088, mailed on Jan. 22, 2013, 3 pages of Office Action and 3 pages of English Translation.

Office Action received for German Patent Application No. 112009000834.8, mailed on May 27, 2014, 6 pages of English Translation and 7 pages of Office Action.

Notice of Grant received for Chinese Patent Application No. 200980110393.9, mailed on Jul. 15, 2013, 2 pages of English Translation and 2 pages of Notice of Grant.

Notice of Grant received for Japanese Patent Application No. 2011-503088, mailed on Jul. 9, 2013, 3 pages of Notice of Grant only.

Office Action received for Chinese Patent Application No. 201310460325.3, mailed on Oct. 8, 2014, 9 pages including 4 pages of English translation.

Notice of Allowance received for Chinese Patent Application No. 201310460325.3, mailed on Apr. 7, 2015, 5 pages including 3 pages of English translation.

*300*

400

500

700

800

900

1200

1300

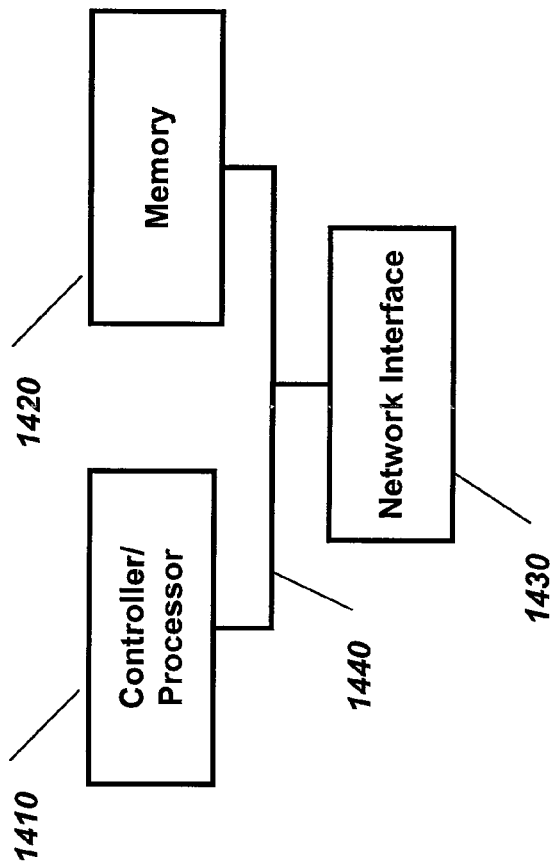

EXPRESS VIRTUAL CHANNELS IN AN ON-CHIP INTERCONNECTION NETWORK

RELATED APPLICATIONS

The present application is a continuation of and claims priority from U.S. patent application Ser. No. 12/061,302, filed Apr. 2, 2008, issued as U.S. Pat. No. 8,223,650 on Jul. 17, 2012, entitled "EXPRESS VIRTUAL CHANNELS IN A PACKET SWITCHED ON-CHIP INTERCONNECTION NETWORK", which is hereby incorporated herein in its entirety and for all purposes.

FIELD

The present invention relates generally to the field of communication between components on a chip multi-processor. The present invention further relates specifically to creating express virtual communication channels between components on the chip multi-processor.

BACKGROUND

A chip multi-processor (CMP) or application-specific systems-on-a-chip (ASOC) may have several components that need to communicate with each other. These components may be such items as a processor, a cache, a data register, or other chip components. The chip components may communicate using a bus system or a dedicated wiring system. Either of these systems may require a great deal of wiring that may use up valuable space on the chip, as well as creating interference between the signals.

The components may communicate in more space efficient manner by using a packet-switching system. A packet-switching system may act by passing packets of data from components to component, reducing the amount of wiring between any two components.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 14 illustrates in a block diagram one embodiment of a computer system that may act as a router node.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and a set of computer instructions, and other embodiments that relate to the basic concepts of the invention. A method, router node, and set of instructions for using express virtual channels in a component network on a chip are disclosed. An input link may receive an express flow control unit from a source node in a packet-switched network via an express virtual channel. An output link may send the express flow control unit to a sink node. A switch allocator may forward the express flow control unit directly to the output link.

Figure 1:
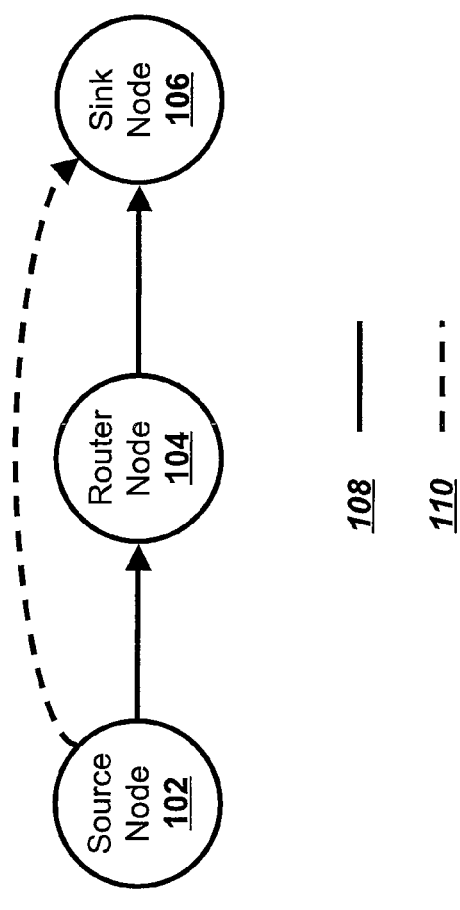
FIG. 1 illustrates in a block diagram one embodiment of chip multiprocessor component data packet transmission.

A chip multi-processor (CMP) or an application-specific system on a chip (ASOC) may have many components that need to communicate with each other. These components may use packet switching to communicate data without using excessive amounts of chip space. FIG. 1 illustrates in a block diagram one embodiment of chip multiprocessor component data transmission 100. A component, acting as a source node 102, may organize a set of data into a data packet. The data packet may be separated into one or more flow control units (FLITs). The source node 102 may transmit each FLIT to the closest available component. The receiving component, acting as a router node 104, may transmit the data to the next closest available component until the component that is acting as the sink node 106 is reached. The path that the FLIT follows from the source node 102 to the sink node 106 may be organized into a virtual channel. In a normal virtual channel (NVC) 108, a source node 102 may transmit a FLIT to a router node 104, which may buffer the FLIT, organize that FLIT and other FLITs coming through the pipeline, then send them to the output link to be sent to the next router node 104 or the sink node 106.

An express virtual channel (EVC) 110 may be used to close the performance and energy gaps between packetized on-chip network and the ideal interconnection fabric by approaching the latency and energy of a dedicated link. An EVC 110 may allow FLITs to bypass intermediate router nodes 104 along pre-defined paths between pairs of nodes. A FLIT traveling on an EVC 110 may be given preference over other FLITs, thereby enabling them to directly use the output link without getting buffered and having to go through the router pipeline at each router node 104. The EVC 110 may facilitate creation of flows within the network in a manner similar to circuit switching without involving any circuit set-up phase, significantly cutting down on packet transmission latency. Moreover, by allowing a FLIT to virtually bypass intermediate router nodes 104, an EVC 110 may reduce the amount of buffering, router switching activity and per-hop resource contention, increasing energy and area efficiency.

Figure 2:
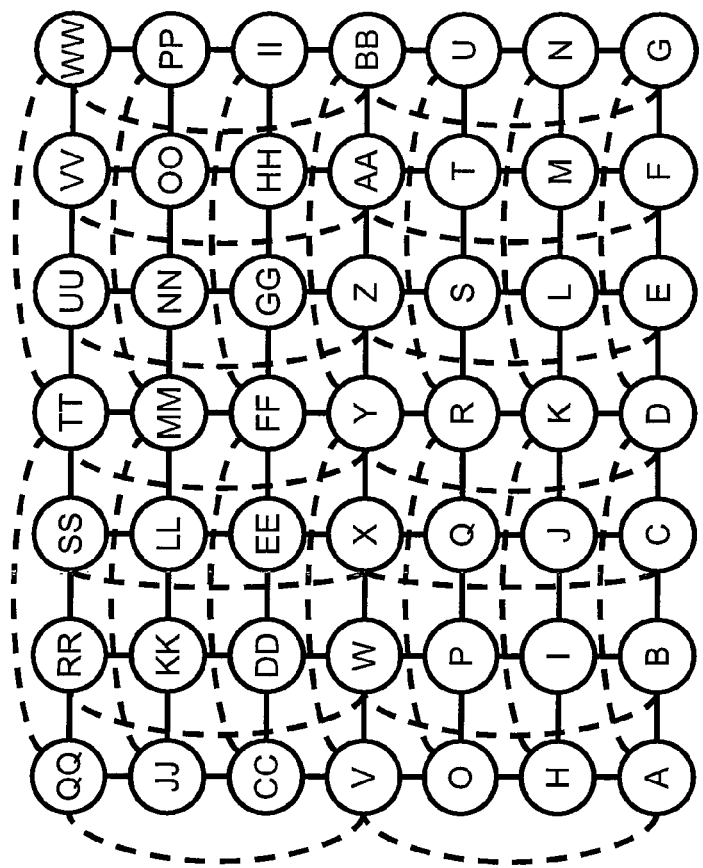
FIG. 2 illustrates as a two dimensional mesh network one embodiment of a component network on a chip.

FIG. 2 illustrates as a two-dimensional mesh network one embodiment of a static EVC packet-switched network 200. While a packet-switched chip multiprocessor network is referenced, an EVC 110 may be used in any packet-switched network. Please note that the size and two-dimensional nature of the mesh network are illustrative and are in no way definitive for the purposes of this invention. Each node 202 may act as a source node 102, a router node 104, or a sink node 106. Each node 202 in the network 200 may be connected to an adjacent node 202 by a NVC 108. Further, a node 202 may be connected to a non-adjacent node by an EVC 110, allowing a FLIT to cross multiple intermediate nodes, or router nodes 104, along a pre-defined path without stopping or buffering at any of the router nodes 104. For example, a FLIT traveling from node B to node G may take a regular NVC path 108 from node B to node D and then take an EVC 110, or link, from node D to node G. An EVC 110 may eliminate the latency through the router nodes 104, such as nodes E and F, and conserve power by eliminating all buffer operations on the router nodes 104. In a static EVC network, specific source nodes 102 and sink nodes 106 may be connected by and EVC 110. While a static EVC 110 of four nodes is used in the present example, a static EVC 110 of greater or lesser length may also be used as chosen.

Figure 3:
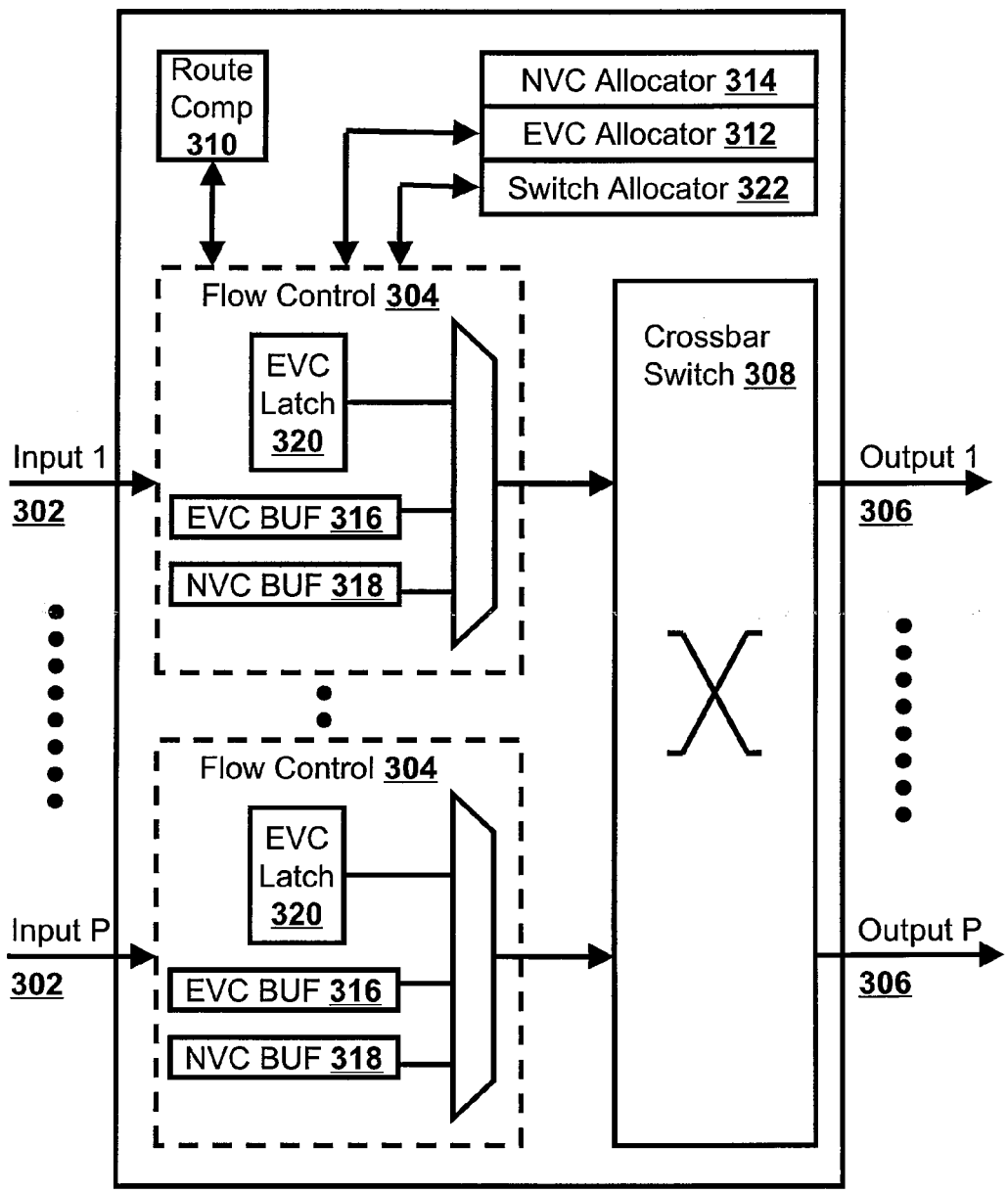
FIG. 3 illustrates in a block diagram one embodiment of a router node micro-architecture implementing an express virtual channel.

The router may implement the express links on top of a virtual channel flow control. The router may designate virtual channels that may only be subscribed by data packets traveling on express paths. FIG. 3 illustrates in a block diagram one embodiment of a router node micro-architecture 300 implementing an EVC 110. A router node 104 may receive a FLIT via a virtual channel on an input link 302 and direct the FLIT to a flow control module 304. The virtual channels used for flow control may be arranged as NVCs 108 and EVCs 110. The flow control module 304 may use the virtual channels to determine FLIT priority in selecting which FLIT to forward to an output link 306 selected by a crossbar switch 308.

A route computation logic module 310 may compute the route computation, or the path of a data packet traveling between a source node 102 and a sink node 106, at each router node 104. The route computation logic module 310 may be responsible for qualifying if a data packet may be placed on an EVC 110. In addition, the route computation logic module 310 may execute look-ahead routing for all data packets, so that once a data packet reaches a node or EVC path 110 end-point, the route computation need not be in the critical path of the router pipeline. Route computation need not in any way impact the base routing algorithm used. An EVC allocator 312 may allocate an EVC 110 to a data packet intending to use an express lane to travel between a pair of nodes while a NVC allocator 314 may allocate a NVC 108 to another data packet intending to travel to a neighboring node.

The flow control module 304 may receive the FLIT from an EVC 110 via an EVC input buffer (EVC BUF) 316 or from a NVC 108 via an NVC input buffer (NVC BUF) 318. An EVC latch 320 may stage a FLIT as it passes through any router node 104 on its express path 110. A FLIT traveling through the EVC latch 320 may pre-empt any other data packet flow on the same output port 306. The EVC latch 320 may interrupt an ongoing data packet transmission between two nodes from being sent by a source node 102, such as a lower priority EVC flow.

A switch allocator 322 may favor an EVC flow 110 over an NVC flow 108. The switch allocator 322 may interrupt an EVC flow 110 of FLITs with fewer hops at the source node 102 so that an EVC flow 110 of FLITs with more hops may use that router node 104. The switch allocator 322 may interrupt an EVC flow 110 of FLITs at a nearer source node 102 so that an EVC flow 110 of FLITs from a farther source node 102 may use that router node 104.

Figure 4:
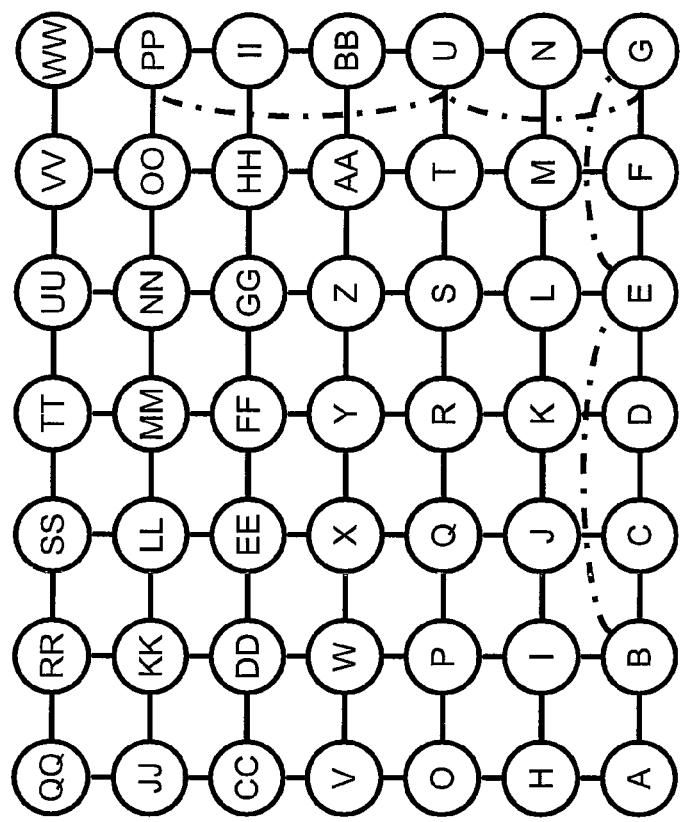
FIG. 4 illustrates as a two-dimensional mesh network one embodiment of a dynamic express virtual channel component network on a chip.

The network 200 may be statically divided into EVCs 110 and NVCs 108, or may have more dynamically created virtual channels. FIG. 4 illustrates as a two-dimensional mesh network one embodiment of a dynamic EVC packet-switched network 400. In a dynamic EVC packet-switched network 400, any set of hops between the nodes 202 may be designated as a dynamic EVC 402. The length of the EVC path 402 may be sized as needed for the path of a given data path, within a maximum EVC length as determined by component network constraints. For example, in a static EVC network 200, a source node 102 may traverse from node B to node C and from node C to node D via a single hop NVC path 108 and from node D to node G via a statically allocated EVC path 110. In a dynamic network that allows a three-hop maximum EVC path 402, the source node 102 may send a FLIT directly from node B to node E, then may use a subset EVC path 402 of a two-hop length to go to node G, and so forth.

Figure 5:
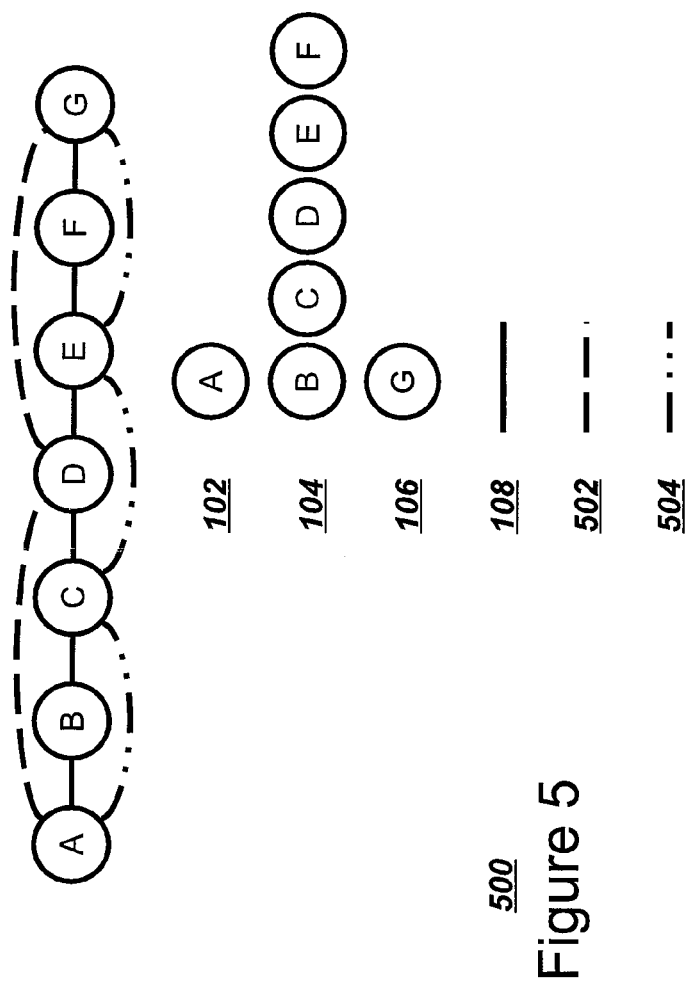
FIG. 5 illustrates as a block diagram one embodiment of a route-flexible dynamic express virtual channel component network on a chip.

FIG. 5 illustrates as a block diagram one embodiment of a route-flexible dynamic EVC component network on a chip 500. At times, a data path may be unable to use the optimal EVC path 502, such as the longest EVC path 502, due to resource constraints. In this case, a source node 102 may send a FLIT via an alternate EVC path 504, such as the next shorter EVC path 504, with available resources. For example, the most efficient data path for a source node A 102 to send a FLIT to sink node G 106 may be to send a FLIT directly from source node A 102 to node D along a first optimal EVC path 502, then from router node D 104 to sink node G 106 along a second optimal EVC path 502. However, the most efficient data path may not have available resources. The source node A 102 may send the FLIT along an alternate path 504 to the sink node. The source node A 102 may send the FLIT along an alternate EVC path 504 to router node C 104, then from router node C 104 to router node E 104, and then from router node E 104 to sink node G 106. The EVC allocator 212 may determine the best route by considering the routing information of the data packet.

Figure 6:
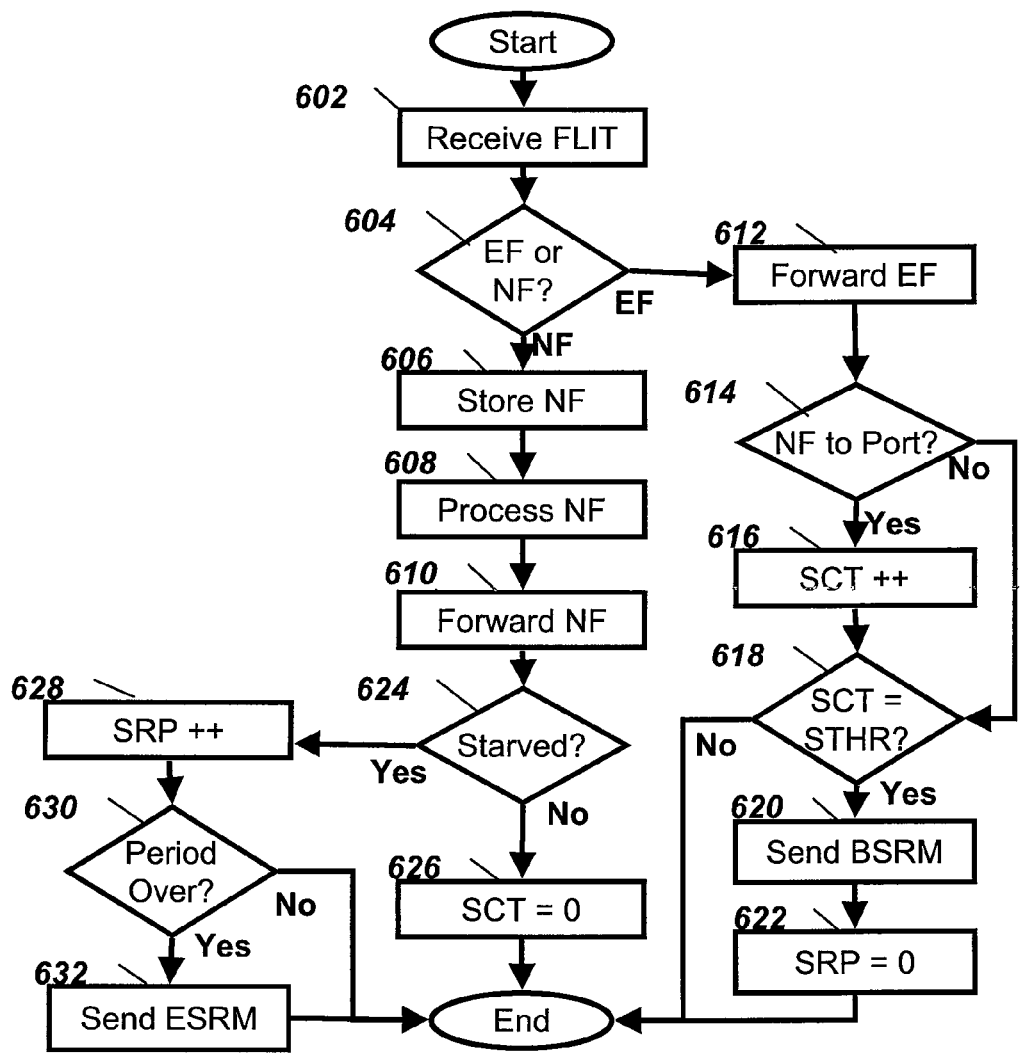
FIG. 6 illustrates in a flowchart one embodiment of a method for a router node to process a data packet from a virtual channel.

FIG. 6 illustrates in a flowchart one embodiment of a method 600 for a router node to process a FLIT from a virtual channel. The router node 104 may receive a FLIT via a virtual channel (VC) (Block 602). If the FLIT is a normal FLIT (NF) (Block 604), then the router node 104 may store the NF in an input buffer (Block 606) and then process the NF (Block 608). A NF may be a FLIT for which the router node 104 is the source node 102, a FLIT that arrived at the router node 104 from a neighboring node on an NVC 108, or a FLIT for which the router node 104 is the terminus of an EVC 110 but is not the sink node 106. The input port may be a NVC input buffer 318 if arriving on a NVC 108 or an EVC input buffer 316 if arriving on an EVC 110. The router node 104 may forward the processed NF to the output link 306 (Block 610). If the FLIT is an express FLIT (EF) 110 (Block 604) the router node 104 may forward the EF to the output link 306 (Block 612). An express FLIT may be a FLIT received by a router node 104 in the middle of an EVC 110.

Figure 7:
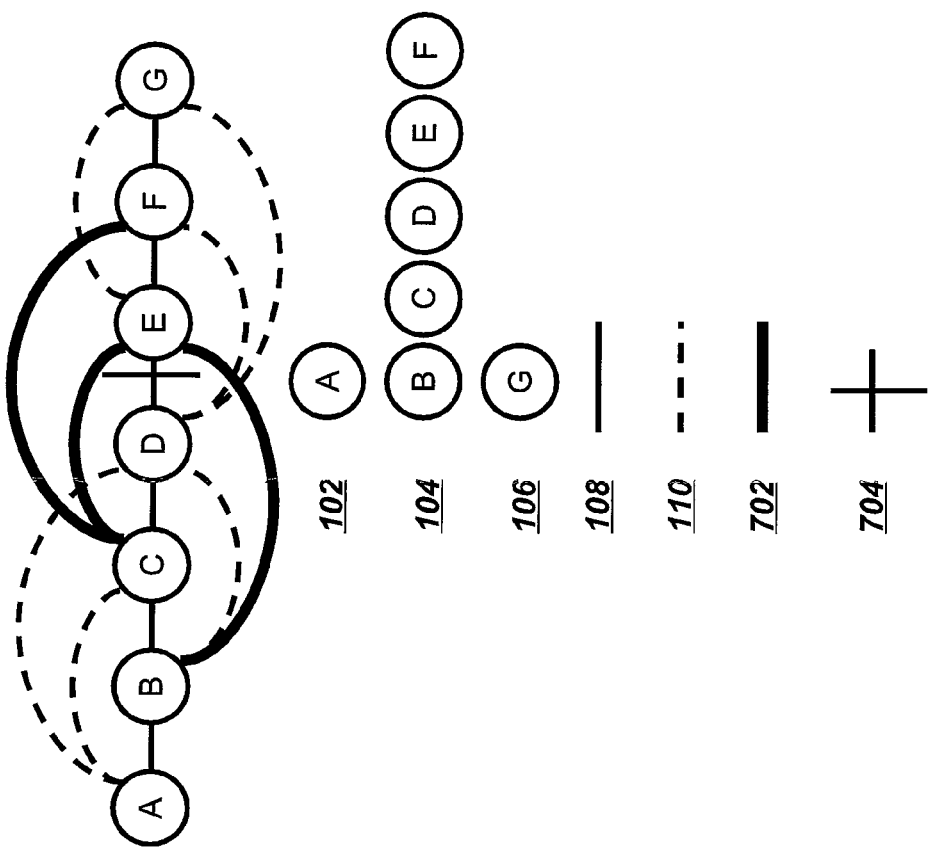
FIG. 7 illustrates in a mesh network one embodiment of an incident of starvation in an express virtual channel network.

In any network which pre-reserves bandwidth for specific message flows, starvation may arise when messages traveling on a pre-established circuit block other messages. FIG. 7 illustrates in a mesh network one embodiment of an incident of starvation 700 in an EVC network. The higher priority given to EFs 702 may lead to a starvation scenario 704. More specifically, if a router node D 104 along the path of an EVC 702 always has an EF incoming to service, a NF buffered locally at the router node D 104 may never get a chance to use the physical channel. An express data packet from further upstream may also continuously starve an express data packet on a different EVC 110 originating in a downstream router.

To remedy this, each router node 104 may maintain a count of the number of consecutive cycles for which the router node 104 has served a specific EVC path 110. After serving express FLITs for a threshold number of consecutive cycles, a router node 104 may send a starvation message, such as a "Begin Starvation Remediation" message or a "Starvation On" token, upstream to the EVC source node A 102 along credit channels. Upon receiving this token, the source node A 102 may stop sending EFs on the corresponding link, allowing a locally starved FLIT to be serviced. After doing so for a set number of cycles, the router node D 104 may send an "End Starvation Remediation" message or a "Starvation Off" token to the EVC source node A 102, signaling that EVC communication may resume.

As shown in FIG. 6, for an EF, if a NF destined for the same output port 306 is buffered (Block 614), the router node 104 may increment a starvation count (SCT) (Block 616). The router node 104 may check the SCT to see if it has reached a starvation threshold (STHR) (Block 618). If the SCT has reached STHR (Block 618), the router node 104 may send a "Begin Starvation Remediation" message (BSRM) upstream to all EVC source nodes 102 (Block 620). After a length of time allowing all appropriate upstream nodes to receive the BRSM, the router node 104 may enter a starvation remediation mode during which the router node is not receiving EFs. While the router node 104 is in starvation remediation mode, the EVC source nodes 102 may pause transmission of EFs, reroute the EFs, or take other compensatory actions. The router node 104 may set the starvation remediation period counter (SRP) to zero (Block 622).

For an NF, if the router node 104 is not in starvation remediation mode (Block 624), the router node 104 may reset the SCT to zero (Block 626). If the router node 104 is in starvation mediation mode (Block 624), the router node 104 may increment the SRP once the NF has been successfully routed to the output port 306 (Block 628). Once the starvation remediation period is over (Block 630), the router node 104 may send a "End Starvation Remediation" message (ESRM) to all upstream EVC source nodes 102, signaling that the router node 104 is once more receiving EFs (Block 632).

A component network on a chip may use buffered flow control techniques to manage buffers and communicate their availability between adjacent router nodes 104. The downstream node may communicate the number of available free buffers to the upstream node through backpressure. Credit-based buffer management may use the upstream router to maintain a count of the number of free buffers available downstream. The count may be decremented each time a FLIT is sent out, thereby consuming a downstream buffer. When a FLIT leaves the downstream node and frees its associated buffer, a credit may be sent back upstream and the corresponding free buffer count may be incremented.

Figure 8:
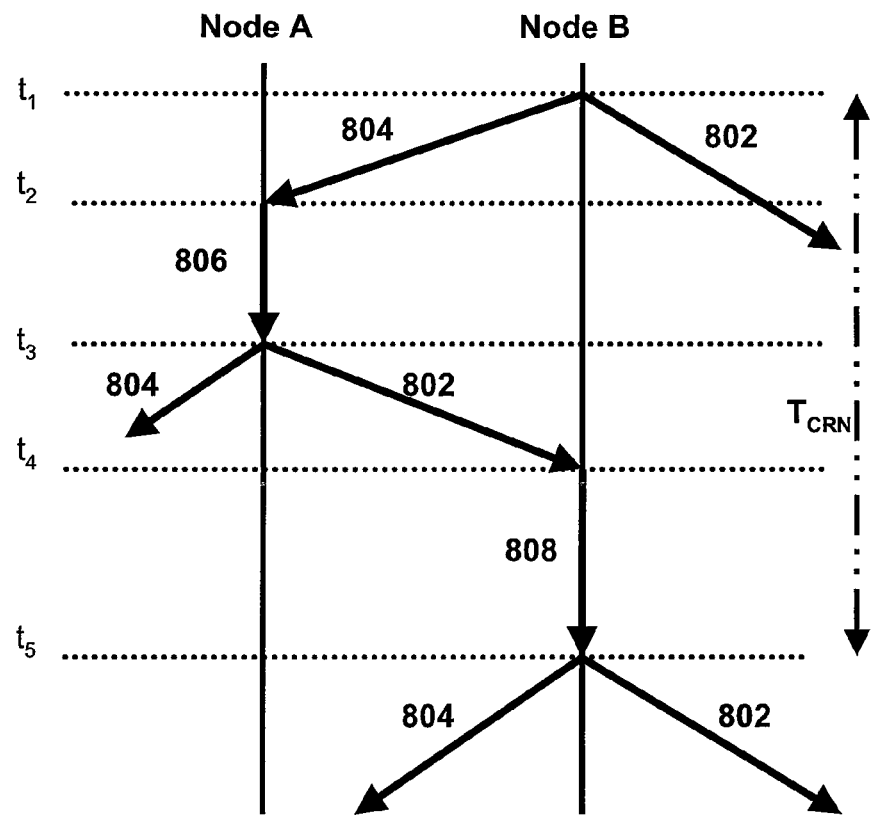
FIG. 8 illustrates in a timeline one embodiment of a normal virtual channel credit-based buffer management system.

The component network may use a simple buffer management scheme to statically allocate buffering to each virtual channel equal to the credit round-trip delay for that virtual channel. FIG. 8 illustrates in a timeline one embodiment of a NVC 108 credit-based buffer management system 800. At time $t_1$, as Node B sends a FLIT to the next node (Arrow 802), Node B may send a credit to Node A between $t_1$ and $t_2$ (Arrow 804). Node A may process the credit between $t_2$ and $t_3$ (Arrow 806). Node A may send a credit to a previous node (Arrow 804) while sending a FLIT to Node B between $t_3$ and $t_4$ (Arrow 802). Node B may be processing the FLIT in the non-express pipeline from $t_4$ to $t_5$ (Arrow 808). Thus, the credit round trip delay ($T_{CRN}$) may take from $t_1$ to $t_5$.

Figure 9:
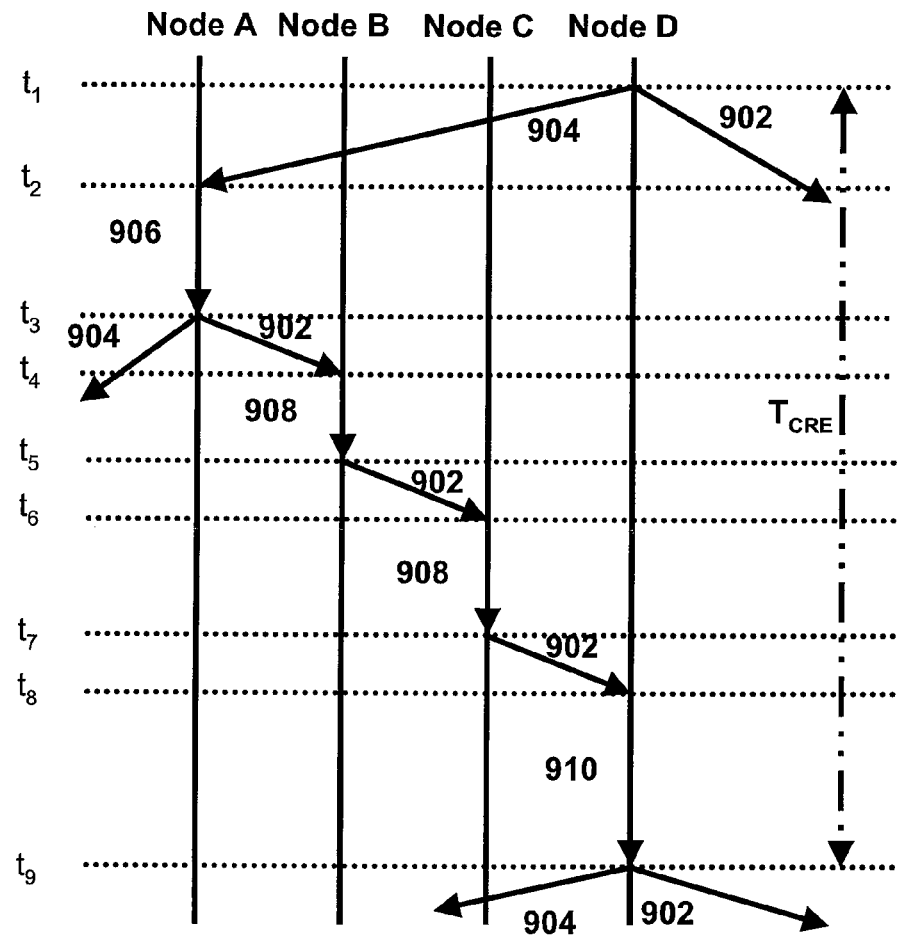
FIG. 9 illustrates in a timeline one embodiment of an express virtual channel credit-based buffer management system.

When using an EVC 110, communication of buffer availability may be done across several hops to ensure a free buffer at the downstream EVC sink node 106. Multi-hop communication of buffer availability may lead to a longer buffer turnaround time, having an adverse effect on throughput. FIG. 9 illustrates in a timeline one embodiment of an EVC 110 credit-based buffer management system 900. At time $t_1$, as Node D sends a FLIT to the next node (Arrow 902), Node D may send a credit to Node A between $t_1$ and $t_2$ (Arrow 904). Node A may process the credit between $t_2$ and $t_3$ (Arrow 906). Node A may send a credit to a previous node (Arrow 904) while sending a FLIT to Node B between $t_3$ and $t_4$ (Arrow 902). Node B may forward the FLIT to the output link as part of the express pipeline from $t_4$ to $t_5$ (Arrow 908). Node B may send a FLIT to Node C between $t_5$ and $t_6$ (Arrow 902). Node C may forward the FLIT to the output link as part of the express pipeline from $t_6$ to $t_7$ (Arrow 908). Node C may send a FLIT to Node D between $t_7$ and $t_8$ (Arrow 902). Node C may be processing the FLIT in the non-express pipeline from $t_8$ to $t_9$ (Arrow 910). Thus, the credit round trip delay ($T_{CRE}$) may take from $t_1$ to $t_9$.

Figure 10:
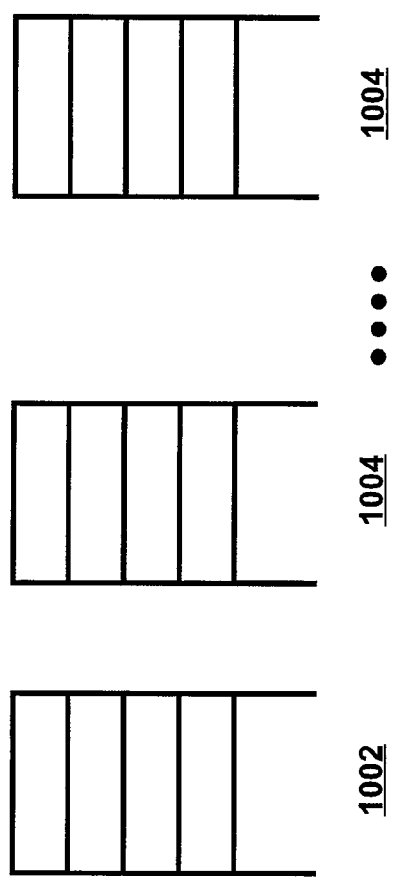
FIG. 10 illustrates in a block diagram one embodiment of a buffer count for a static buffer management system.

The buffer management system may organize the buffers statically. FIG. 10 illustrates in a block diagram one embodiment of a buffer count for a static buffer management system 1000. A static number of buffers may be assigned to each virtual channel, reserved for FLITs arriving on each virtual channel. A NVC set of buffers 1002 may be reserved for each NVC 108 and an EVC set of buffers 1004 may be reserved for each EVC 110. The size of each EVC set of buffers 1004 may take into account the $T_{CRE}$ when setting the number of buffers in the set.

Static buffer management may be inefficient in allocating buffers in case of adversarial traffic. For example, if the majority of network traffic is only with an immediate neighbor, an EVC 110 might never be used and the buffer space statically assigned to EVCs 110 might go unutilized. Instead of statically partitioning buffers into VCs, such as NVC 108 and EVC 110, buffers may be assigned to a VC on demand. A high-water mark scheme to signal the existence of an EVC to an upstream node may prioritize short hop EVCs 402 or NVCs 108 over long hops as buffers become available. For example, if a two hop EVC 402 requires at least eight buffers to be available, then the downstream router may signal an upstream router that an EVC 402 two nodes away is available when the buffer count at the downstream router equals eight. The buffers may be allowed to float freely across VCs, such that a VC may have only one FLIT.

Figure 11:
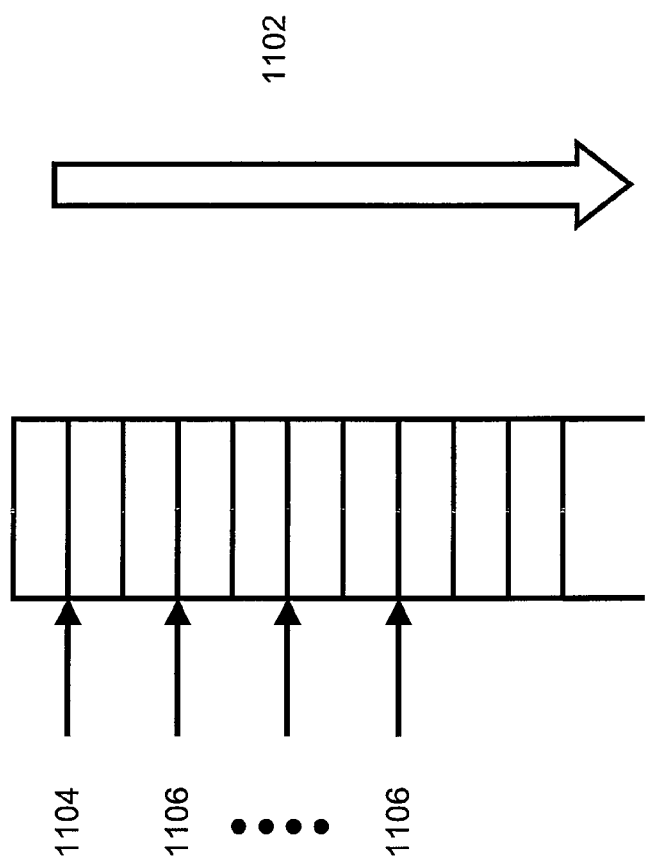
FIG. 11 illustrates in a block diagram one embodiment of a buffer count for a dynamically shared buffer management system.

FIG. 11 illustrates in a block diagram one embodiment of a buffer count for a dynamically shared buffer management system 1100. The buffer count 1102 may denote the number of available, or free, buffers. If the buffer count 1102 indicates that the number of buffers available is equal to the NVC threshold number 1104, or the number of buffers needed to operate the NVC 108, the node may use a NVC 108. If the buffer count 1102 indicates that the number of buffers available is equal to the EVC threshold number 1106, or the number of buffers needed to operate the EVC 402, the node may use an EVC 402. The EVC threshold 1106 may be related to the length of the EVC path 402.

Figure 12:
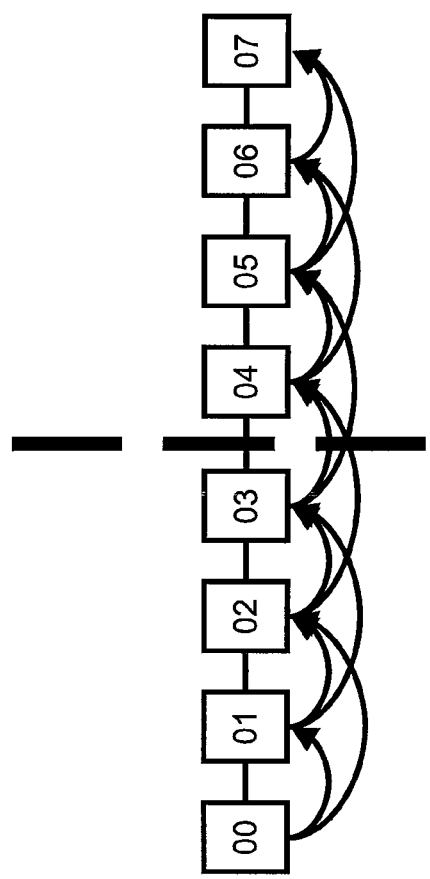
FIG. 12 illustrates in a block diagram one embodiment of the combination of paths that may be available to and from a given node.

To enable flexible buffering, the downstream router may have to send appropriate signals to the upstream routers. FIG. 12 illustrates in a block diagram one embodiment of the combination of paths 1200 that may be available to and from a given node. While an eight-node network is shown, other sizes of networks may be used.

Figure 13:
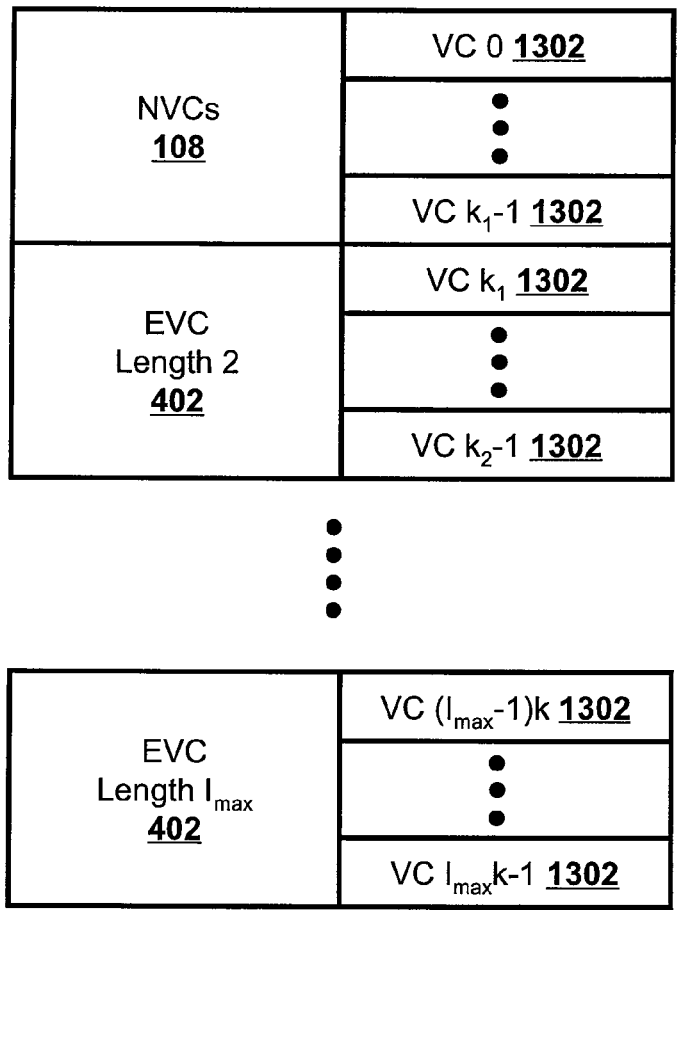
FIG. 13 illustrates in a block diagram one embodiment of a static partitioning of virtual channels.

The VCs may be partitioned statically. FIG. 13 illustrates in a block diagram one embodiment of a static partitioning 1300 of virtual channels. The total number of VCs 1302, or packet state trackers, may be divided between both NVCs 108 and the different length EVCs 402. This division may be done at design time. For a component network having a capability for EVC lengths of up to $I_{MAX}$, a total of $(k \times I_{MAX})$ set of virtual channels may be provisioned. The component network may assign $k_1$ virtual channels 1302 for NVCs 108, $k_2$ virtual channels for EVC 402 of length two, $k_3$ virtual channels for EVC 402 of length three, and so on.

FIG. 14 illustrates a possible configuration of a computing system 1400 to act as a router node 104 in a packet-switched network. The router node 104 may include a controller/processor 1410, a memory 1420, a network interface 1430, connected through bus 1440. The router node 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 1410 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the EVC routing method as described herein may be used to implement the decision support system functions of this invention.

The memory 1420 may include volatile and nonvolatile data storage, including one or more electrical, magnetic or optical memories such as a random access memory (RAM), cache, hard drive, or other memory device. The memory may have a cache to speed access to specific data. The memory 1420 may also be connected to a compact disc-read only memory (CD-ROM), digital video disc-read only memory (DVD-ROM), DVD read write input, tape drive, or other removable memory device that allows data to be directly uploaded into the system.

The network connection interface 1430 may be connected to a communication device, modem, network interface card, a transceiver, or any other device capable of transmitting and receiving signals from a network. The network connection interface 1430 may be used to connect the router node 104 to the network. The components of the router node 104 may be connected via an electrical bus 1440, for example, or linked wirelessly.

Client software and databases may be accessed by the controller/processor 1410 from memory 1420, and may include, for example, database applications, word processing applications, as well as components that embody the decision support functionality of the present invention. The router node 104 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network.

Embodiments within the scope of the present invention may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. Multiple instances of the electronic devices each may process the content in various possible ways. It does not necessarily need to be one system used by all end users. Accordingly, the appended claims and their legal equivalents should only define the invention, rather than any specific examples given.

The invention claimed is:

1. A method, comprising:
   receiving an express flow control unit from a source node via an express virtual channel; and
   forwarding the express flow control unit directly to an output link to send to a sink node based on a comparison of a starvation counter value and a starvation threshold value,
   wherein the starvation counter is to be updated each time a normal flow control unit, destined for the same output port as the express flow control unit, is buffered, wherein the express flow control unit is to be given preference over other non-express flow control units based only on a determination that the express flow control unit is traveling on the express virtual channel, wherein the express flow control unit bypasses one or more intermediate nodes along one or more pre-defined paths between pairs of nodes, without the express flow control unit being buffered.

2. The method of claim 1, further comprising:
   tracking express flow control units received from the express virtual channel;
   entering starvation remediation mode if a starvation threshold is reached; and
   transmitting a normal flow control unit to an adjacent node.

3. The method of claim 1, wherein the express virtual channel has a static length.

4. The method of claim 1, wherein the express virtual channel has a dynamic length.

5. The method of claim 1, wherein the express virtual channel is an alternate express virtual channel if an optimal express virtual channel is unavailable.

6. The method of claim 1, wherein the express virtual channel has a statically assigned buffer.

7. The method of claim 1, wherein the express virtual channel has a dynamically assigned buffer.

8. The method of claim 1, wherein the express flow control unit is to bypass the one or more intermediate router nodes along the one or more pre-defined parts between pairs of notes, without the express flow control unit traversing through a router pipeline at each of the one or more intermediate router nodes.

9. A router node, comprising:
   an input link to receive an express flow control unit from a source node via an express virtual channel;
   an output link to send the express flow control unit to aسink node based on a comparison of a starvation counter value and a starvation threshold value, wherein the starvation counter is to be updated each time a normal flow control unit, destined for the same output port as the express flow control unit, is buffered; and
   a switch allocator to forward the express flow control unit directly to the output link, wherein the express flow control unit is to be given preference over other non-express flow control units based only on a determination that the express flow control unit is traveling on the express virtual channel, wherein the express flow control unit is to bypass one or more intermediate nodes along one or more pre-defined paths between pairs of nodes, without the express flow control unit being buffered.

10. The router node of claim 9, further comprising a starvation counter to determine if a starvation threshold is reached, so that a normal flow control unit may reach an adjacent node.

11. The router node of claim 9, wherein the express virtual channel has a static length.

12. The router node of claim 9, wherein the express virtual channel has a dynamic length.

13. The router node of claim 9, wherein the express virtual channel is an alternate express virtual channel if an optimal express virtual channel is unavailable.

14. The router node of claim 9, wherein the express virtual channel has a statically assigned buffer.

15. The router node of claim 9, wherein the express virtual channel has a dynamically assigned buffer.

16. The router node of claim 9, wherein a chip multiprocessor is to comprise the router.

17. A non-transitory storage medium having a set of instructions, the set of instructions executable by a processor to implement a method for processing data, the method comprising:
   receiving an express flow control unit from a source node via an express virtual channel; and
   forwarding the express flow control unit directly to an output link to send to a sink node based on a comparison of a starvation counter value and a starvation threshold value, wherein the starvation counter is to be updated each time a normal flow control unit, destined for the same output port as the express flow control unit, is buffered, wherein the express flow control unit is to be given preference over other non-express flow control units based only on a determination that the express flow control unit is traveling on the express virtual channel, wherein the express flow control unit bypasses one or more intermediate nodes along one or more pre-defined paths between pairs of nodes, without the express flow control unit being buffered.

18. The non-transitory storage medium of claim 17, further comprising:
   tracking express flow control units received from the express virtual channel;
   entering starvation remediation mode if a starvation threshold is reached; and
   transmitting a normal flow control unit to an adjacent node.

19. The non-transitory storage medium of claim 17, wherein the express virtual channel has a dynamic length.

20. The non-transitory storage medium of claim 17, wherein the express virtual channel is an alternate express virtual channel if an optimal express virtual channel is unavailable.

21. The non-transitory storage medium of claim 17, wherein the express virtual channel has a dynamically assigned buffer.

* * * * *